April 4, 1967   F. W. SAMPSON   3,312,331
BRAKE OPERATOR MECHANISM
Original Filed March 14, 1963   2 Sheets-Sheet 1

INVENTOR.
Frederick W. Sampson
BY
His Attorney

United States Patent Office 3,312,331
Patented Apr. 4, 1967

3,312,331
BRAKE OPERATOR MECHANISM
Frederick W. Sampson, Dayton, Ohio, assignor to General Motors Corporation, Detroit, Mich., a corporation of Delaware
Original application Mar. 14, 1963, Ser. No. 265,415. Divided and this application Jan. 27, 1965, Ser. No. 428,515
2 Claims. (Cl. 188—106)

This application is a division of application Ser. No. 265,415, filed Mar. 14, 1963.

The invention relates to a brake mechanism and more particularly to a brake mechanism of the type utilized in automotive vehicles. The brake constructions in common usage today are of the duo-servo type wherein the shoes are actuated by a wheel cylinder assembly containing opposed pistons moved by means of hydraulic pressure. The rear brake assemblies are also commonly provided with a mechanical brake actuating system for emergency and parking purposes.

Features of the mechanism embodying the invention include the provision of a single retractor spring which is provided with a heat shield formed by the spreader strut, and engages the spreader strut and the spreader strut actuating lever so that neither of these elements rattles when the brakes are released.

By utilizing the anchor construction of the above identified application of which this application is a division, a considerable space saving is utilized so that brakes of adequate capacity can be provdied in smaller drums necessitated by smaller wheel diameters on many cars now in production. The construction arranges the shoe web so that it does not have to extend over the wheel cylinder and boot, thus providing a stronger web construction. This also gives an increase in space between the wheel cylinder and the axle so that a single retractor spring can be utilized. The retractor spring and spreader strut features of the invention permit the elimination of one spring from previous constructions as well as the provision of a low rate low stress spring due to increased available space for the spring as compared to previous designs.

Figure 1:
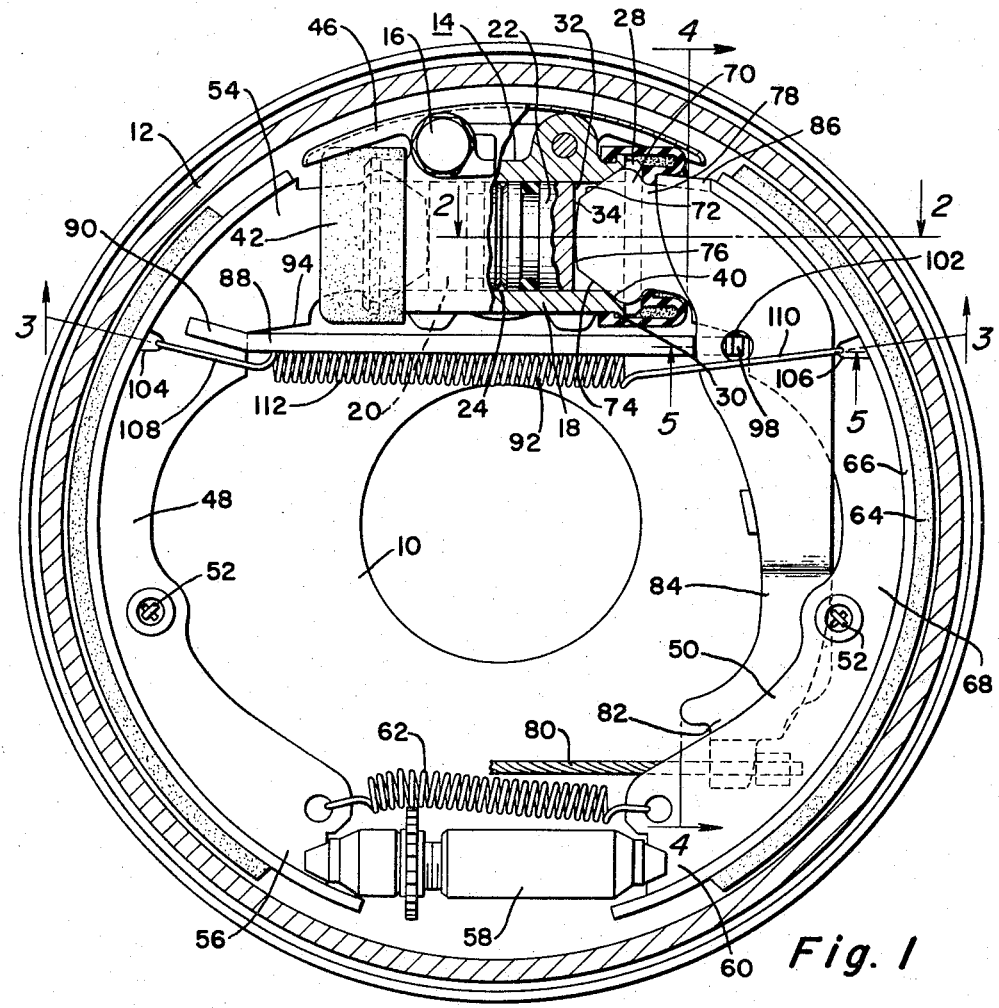
FIGURE 1 is an elevation view of a vehicle brake embodying the invention and having parts broken away and in section.

The brake assembly illustrated in FIGURE 1 is of the duo-servo type and includes mechanism normally provided for the rear brakes. It thus includes a hydraulically actuated system and a mechanically actuated system.

Figure 2:
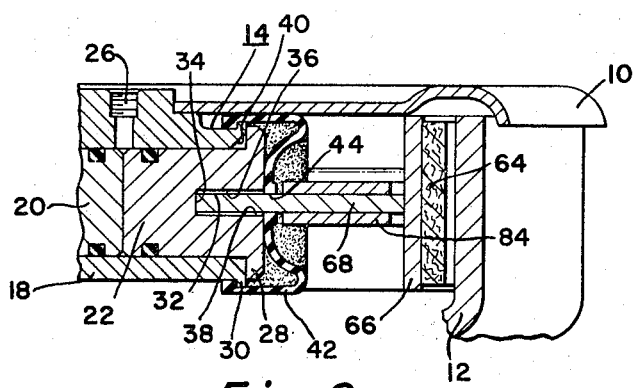
FIGURE 2 is a fragmentary cross-section of a portion of the brake mechanism of FIGURE 1 taken in the direction of arrows 2—2 of that figure.

The brake assembly includes a backing plate 10 which is suitably secured to the vehicle so that it is nonrotatable, in the usual well known manner. The vehicle wheel is provided with a brake drum 12 which is rotatably mounted relative to the backing plate. As can be seen in FIGURE 2, the backing plate may be embossed so that it extends around the edge of the drum to minimize the introduction of foreign matter into the brake. A wheel cylinder assembly 14 is suitably secured to the backing plate 10 by bolts 16. Wheel cylinder assembly 14 includes a cylinder body 18 and opposed pistons 20 and 22 which are reciprocably received within the body so that they move in the cylinder 24 when pressurized fluid is introduced between the pistons through the passage 26. Since pistons 20 and 22 are identical, only piston 22 will be further described in detail. The piston is provided with a flange 28 formed on the outer end of the piston and having a greater diameter than the cylinder 24 so that the flange engages the cylinder body end 30 when the piston is fully retracted. A slot 32 is formed in the outer end of the piston and extends inwardly beyond flange 28 into the piston body. Slot 32 is vertically oriented in the completed assembly so that its bottom surface 34 lies in a vertical plane perpendicular to the slot vertical side surfaces 36 and 38. Slot 32 passes through the center line of the piston 22.

The wheel cylinder body end 30 is provided with a countersink 40 which is preferably of a slotted nature so that it is in alignment with slot 32. In FIGURE 2 countersink 40 is shown rotated 90° about the cylinder axis from its true position. The bottom surface of the countersink 40 tapers inwardly toward the center line of the cylinder 24. Cylinder end 30 is also provided with a boot 42 which is suitably secured to the cylinder end and encloses the piston flange 28. A slotted access opening 44 is provided in boot 42 to receive the shoe web to be described.

A heat shield 46, suitably formed of sheet metal, is secured intermediate the wheel cylinder assembly 14 and the drum 12 so that it overlaps the wheel cylinder boots and body to shield the wheel cylinder assembly from heat radiated from the drum. This is particularly advantageous in smaller diameter brake assemblies where the wheel cylinder is mounted quite close to the drum.

The primary brake shoe 48 and the secondary brake shoe 50 are resiliently secured to the backing plate 10 by means of the usual hold-down spring assemblies 52. Each shoe is generally similar but oppositely mounted so that the shoe end 54 of the primary shoe 48 is engaged by the wheel cylinder piston 20 and the shoe other end 56 engages the adjuster mechanism 58. The end 60 of shoe 50 also engages the adjuster mechanism 58 and the usual spring 62 is attached to the shoe ends 56 and 60 to hold them into engagement with the adjuster mechanism.

Shoe 50 includes a lining 64 mounted on a rim 66 to which is attached the shoe web 68 in the usual T arrangement wherein the web is centered on the rim. The upper end 70 of shoe 50 engages the piston 22 of the wheel cylinder assembly and is received in the slot 32 of that piston. The shoe web end 70 is formed as an enlarged head with oppositely tapered surfaces 72 and 74 and a slightly curved extreme end 76. Extreme end 76 engages the bottom surface 34 of the slot 32 and the tapered surfaces 72 and 74 are aligned for surface engagement with the countersink 40 of the wheel cylinder body. The neck 78 of the shoe end 70 is received in the boot slotted opening 44 so that the boot seals about the web.

Figure 3:
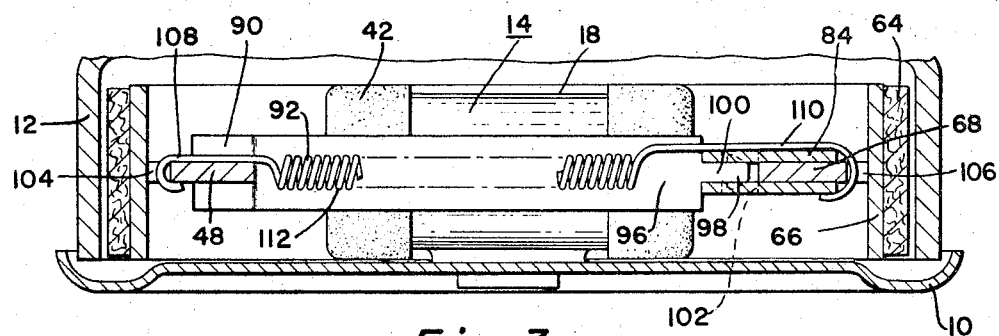
FIGURE 3 is a fragmentary cross-section view of another portion of the brake mechanism of FIGURE 1 taken in the direction of arrows 3—3 of that figure.
Figure 4:
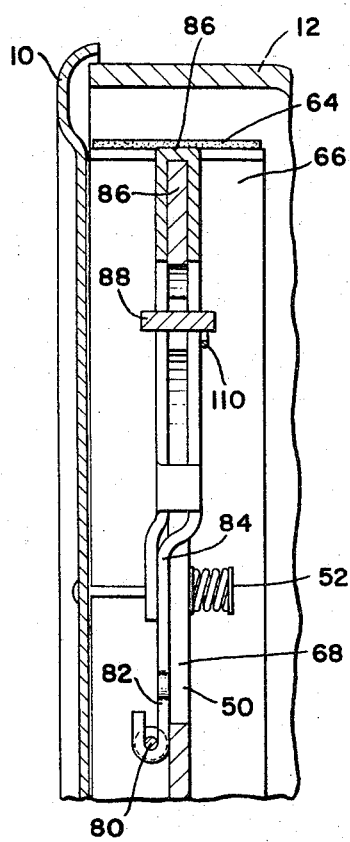
FIGURE 4 is a fragmentary cross-section view of still another portion of the brake mechanism of FIGURE 1 taken in the direction of arrows 4—4 of that figure.
Figure 5:
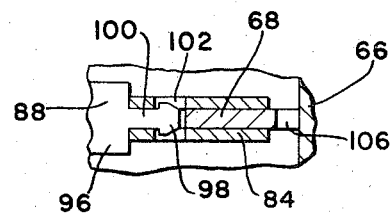
FIGURE 5 is a fragmentary cross-section view of a detail of the brake mechanism of FIGURE 1 taken in the direction of arrows 5—5 of that figure.

The emergency and parking brake actuating linkage includes the cable 80 which is secured to the lower end 82 of the actuating lever 84. This lever has a looped construction so that it is received on opposite sides on the shoe web 68 adjacent the upper half of the web. This construction is best seen in FIGURES 1 and 4. Lever 84 may be formed from a single stamping. The upper end 86 extends over the neck 78 of the web 68 so that the lever is pivotally movable on the web about this point. A spreader strut 88 extends between the primary shoe 48 and the actuating lever 84 immediately underneath the wheel cylinder assembly 14. Strut 88 is illustrated best in FIGURES 3 and 5 wherein it is shown that the bifurcated strut end 90 fits over the web of shoe 48 and the strut is of sufficient width to overlay the retractor spring 92, which is attached to shoes 48 and 50. The strut end 90 is prevented from upward movement relative to shoe 48 by the notched web construction 94. The other end 96 of the strut 88 is provided with an enlarged key 98 on the strut extension 100 so that the strut extends between the side walls of the actuating lever 84 and the key 98 extends transversely through the passage 102 formed through the actuating lever side walls. This locks the strut against excess movement relative to the actuating lever 84.

The webs of the shoes 48 and 50 are notched at 104 and 106 to respectively receive the retractor spring extended ends 108 and 110. Notches 104 and 106 are preferably substantially in alignment with the strut spreader 88 so that the retractor spring coil section 112 is forced upwardly against the lower surface of the strut 88 to hold the strut upwardly in place and prevent strut rattle. This eliminates the necessity of providing a separate antirattle spring for the strut. The spring end 110 also extends alongside an outer wall of actuating lever 84 so that there is a side load of the spring extension end against the lever 84 to prevent this lever from rattling. Due to the width of strut 88, the retractor spring 92 is protected from heat radiated from the drum and the wheel cylinder, thus increasing the spring life.

Due to the long arcuate length available for retractor spring 92, this spring may have a lower rate and lower tension than the relatively short retractor springs usually provided. The brake arrangement also eliminates the usual anchor pin construction and utilizes the wheel cylinder body end and countersink as the anchor, with a simultaneous anchoring system wherein the piston flange 28 engages the wheel cylinder body end 30 to limit the piston retracting movement so that the curved extreme end 76 of the shoe web is limited from further inward movement, under influence of the retractor spring, by the bottom surface 34 of the piston slot 32. It is usually desirable to dimension the wheel cylinder elements and the web end so that both brake shoe limiting arrangements become active at the same time, although under some conditions it may be desirable that one be active and the inactive arrangement to be a "back-up" arrangement. This construction gives a socket arrangement which better supports the shoe in a vertical plane when the brake is not applied and permits the shoe web to be constructed with no weak cross-section points as are required when an anchor pin is utilized between the wheel cylinder assembly and the drum. A stronger shoe assembly is thus provided than heretofore.

What is claimed is:

1. In a vehicle brake mechanism having a rotatable drum and a nonrotatable backing plate and a wheel cylinder assembly secured to said backing plate and primary and secondary shoes actuated by said wheel cylinder, a single retractor spring having the opposite ends thereof engaging said shoes and extending substantially parallel to and immediately underneath said wheel cylinder assembly, a spreader strut engaging said shoes and a lever for actuating said spreader strut to mechanically actuate the brake, said spreader strut being wider than said single retractor spring and positioned intermediate said wheel cylinder and said single retractor spring throughout at least the coiled length of said spring to provide a heat shield for said spring, said retractor spring having a linear extension at one end thereof engaging one of said shoes and extending alongside said spreader strut actuating lever and exerting a side load thereon urging said lever into continuous surface engagement with the web of the one shoe to prevent the actuating lever from rattling against the shoe web.

2. In a vehicle brake mechanism having a rotatable drum and a nonrotatable backing plate and a wheel cylinder assembly secured to said backing plate and primary and secondary shoes actuated by said wheel cylinder, a single retractor spring having the opposite ends thereof engaging said shoes and extending substantially parallel to and immediately underneath said wheel cylinder assembly, a spreader strut engaging said shoes and a lever for actuating said spreader strut to mechanically actuate the brake, said spreader strut being wider than said single retractor spring and positioned intermediate said wheel cylinder and said single retractor spring throughout at least the coiled length of said spring to provide a heat shield for said spring, said actuating lever being a looped member having one shoe web received therein and said spreader struct having a key end received in the loop of said actuating lever and held in locking position therein by means of an enlarged head formed on said key end and a transverse passage formed in said actuating lever receiving said enlarged head.

References Cited by the Examiner
UNITED STATES PATENTS 2,287,239  6/1942  Goepfrich _____ 188—106 X
2,374,536  4/1945  Goepfrich _____ 188—106 X DUANE A. REGER, *Primary Examiner.*